(12) United States Patent
Vivekraja et al.

(10) Patent No.: US 12,073,199 B2
(45) Date of Patent: Aug. 27, 2024

(54) REDUCING COMPUTATION IN NEURAL NETWORKS USING SELF-MODIFYING CODE

(71) Applicant: Amazon Technologies, Inc., Seattle, WA (US)

(72) Inventors: Vignesh Vivekraja, Santa Clara, CA (US); Randy Renfu Huang, Morgan Hill, CA (US); Yu Zhou, Pflugerville, TX (US); Ron Diamant, Albany, CA (US); Richard John Heaton, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 537 days.

(21) Appl. No.: 16/433,786

(22) Filed: Jun. 6, 2019

(65) Prior Publication Data

US 2020/0387799 A1 Dec. 10, 2020

(51) Int. Cl.
*G06N 3/10* (2006.01)
*G06F 8/41* (2018.01)
*G06N 3/04* (2023.01)

(52) U.S. Cl.
CPC .............. *G06F 8/4441* (2013.01); *G06N 3/04* (2013.01); *G06N 3/10* (2013.01)

(58) Field of Classification Search
CPC .......... G06N 3/10; G06N 3/04; G06N 3/0445; G06N 3/0454; G06N 3/0481; G06N 3/105; G06F 8/4441
See application file for complete search history.

(56) References Cited

U.S. PATENT DOCUMENTS

| 2002/0013938 A1* | 1/2002 | Duesterwald ......... G06F 9/3832 717/160 |
| 2004/0015916 A1 | 1/2004 | Click et al. |
| 2006/0075394 A1* | 4/2006 | Iwamoto ............ G06F 9/44521 717/162 |
| 2016/0246602 A1* | 8/2016 | Radhika ................ G06F 9/3804 |

OTHER PUBLICATIONS

Kim et al. ("Wish Branches Combining Conditional Branching and Predication for Adaptive Predicated Execution", 39th Annual IEEE/ACM International Symposium on Microarchitecture (MICRO'05), 2005, pp. 1-12) (Year: 2005).*

(Continued)

*Primary Examiner* — Vincent Gonzales
(74) *Attorney, Agent, or Firm* — Kilpatrick Townsend & Stockton LLP

(57) ABSTRACT

In various implementations, provided are systems and methods for reducing neural network processing. A compiler may generate instructions from source code for a neural network having a repeatable set of operations. The instructions may include a plurality of blocks. The compiler may add an overwrite instruction to the plurality of blocks that, when executed by one or more execution engines, triggers an overwrite action. The overwrite action causes the instructions of subsequent blocks to be overwritten with NOP instructions. The overwrite action is triggered only when a condition is satisfied.

13 Claims, 12 Drawing Sheets

(56) References Cited

OTHER PUBLICATIONS

Panda et al. ("Conditional Deep Learning for Energy-Efficient and Enhanced Pattern Recognition", 2016 Design, Automation, & Test in Europe Conference & Exhibition, IEEE, 2016, pp. 475-480) (Year: 2016).*

Brogioli et al. ("Parallelization Strategies for Network Interface Firmware", 2006, pp. 1-8) (Year: 2006).*

Xue et al. ("AMASS: Automated Software Mass Customization via Feature Identification and Tailoring", EAI Endorsed Transactions on Security and Safety, Apr. 2019) (Year: 2019).*

Schuler et al. ("code in embedded systems Dynamic Reconfiguration for Irregular Code using FNC-PAE Processor Cores", 2011 IEEE International Parallel & Distributed Processing Symposium, 2011, pp. 244-249) (Year: 2011).*

Severance et al. ("Wavefront Skipping using BRAMs for Conditional Algorithms on Vector Processors", FPGA'15, 2015, pp. 171-180) (Year: 2015).*

Bae et al., "Auto-Tuning CNNs for Coarse-Grained Reconfigurable Array-Based Accelerators", IEEE Transactions on Computer Aided Design of Integrated Circuits and Systems, vol. 37, No. 11, Nov. 1, 2018, pp. 2301-2310.

Chang et al., "Accelerating Recurrent Neural Networks through Compiler Techniques and Quantization", Conference on Neural Information Processing Systems (NIPS), Dec. 3, 2018, 8 pages.

Application No. PCT/US2020/035576, "International Search Report and Written Opinion", Mailed On Sep. 11, 2020, 14 pages.

* cited by examiner

REDUCING COMPUTATION IN NEURAL NETWORKS USING SELF-MODIFYING CODE

BACKGROUND

Artificial intelligence is an area of research and engineering seeking to build intelligent machines that can make decisions in the same way that humans do. Artificial neural networks fall within a sub-field of artificial intelligence called machine learning. Machine learning is a field of study that investigates giving computers the ability to learn without being explicitly programmed. A program that implements a machine learning algorithm is able to learn to perform tasks without requiring explicit code in the program to account for every possibility or all possible behaviors.

The architecture of a neural network may include an input layer, an output layer, and a number of intermediate layers, often referred to as hidden layers. Each layer executes a computation on the outputs of the previous layer, with the last layer (the output layer) providing a final result. With more layers, a neural network can, theoretically, perform more complex tasks, such as language translations and identifying (or classifying) the contents of an image. A neural network with more than three hidden layers is sometimes referred to as a deep neural network. Deep neural networks can have many hidden layers, such as, for example, between five and more than a thousand layers.

Neural networks can be implemented using a Central Processing Unit (CPU) to perform the computations. CPUs, however, tend to be optimized for sequential rather than parallel computations, and thus can suffer from poor response times. Graphics Processing Units (GPUs) are optimized for parallel computations, but not necessarily for the result from one computation unit to be provided directly to another computation unit. Often, the result must first be written to a memory and then read back. Although GPUs can have better response times than CPUs, it would still be desirable to improve the execution time of a neural network.

BRIEF DESCRIPTION OF THE DRAWINGS

Various embodiments in accordance with the present disclosure will be described with reference to the drawings, in which.

DETAILED DESCRIPTION

Figure 1:
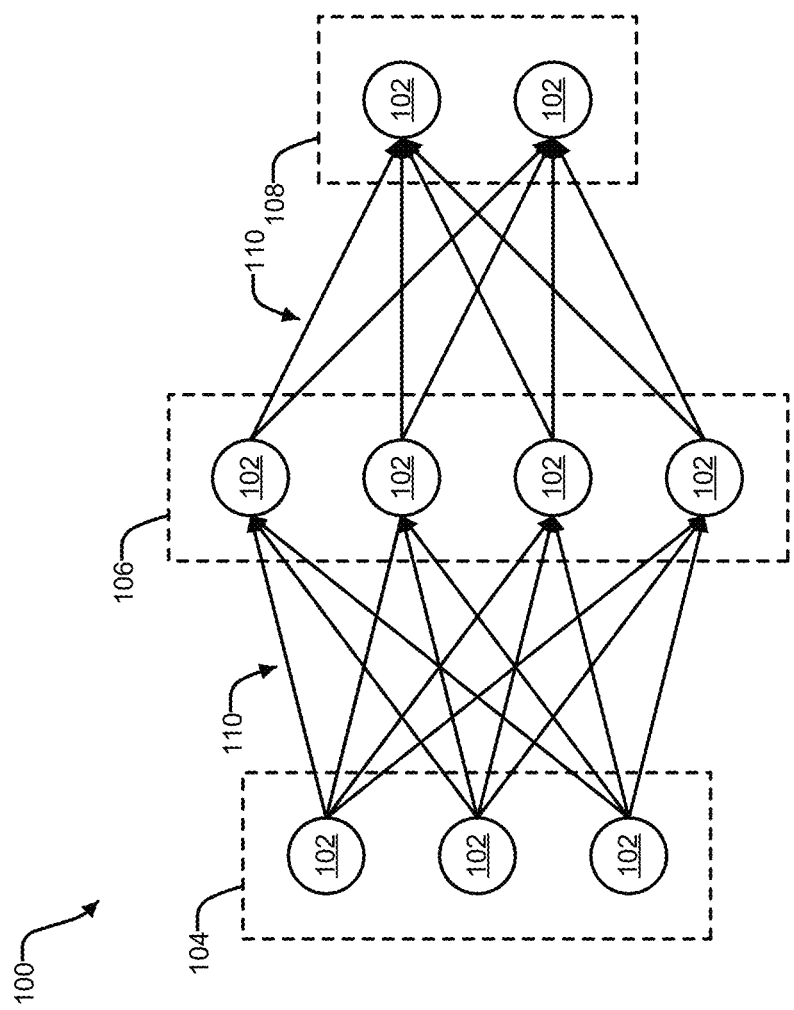
FIG. 1 illustrates an example of a model for a neural network.

In some neural networks, such as recurrent neural networks, the operations performed by a particular layer or node are repeated multiple times, each time with different input data based on the output data of the previous iteration. Such neural networks may be represented with a data flow graph having a feedback loop that indicates that the output data from a particular layer/node is fed back as the input data for the particular layer/node (or, more generally, the repeated set of operations may include a single layer/node and/or multiple layers/nodes). The number of iterations that are performed on the set of operations may be static or dynamic, as dictated by the control flow of the neural network. For example, the number of iterations may be static if the set of operations are implemented in a "for" loop with no break conditions. In contrast, the number of iterations may be dynamic if the set of operations are implemented in a "while" loop or in a "for" loop with break conditions, among other possibilities.

Many processors, such as single instruction multiple data (SIMD) processors, may not directly support the execution of a repeatable set of operations having a dynamic length. In many instances, the repeatable set of operations are compiled having a static length for the maximum number of iterations, and the output data from any redundant computations beyond the desired number of iterations is discarded. For example, a neural network may include a repeatable set of operations having 20 maximum iterations with break conditions that are highly likely to be satisfied much prior to the $20^{th}$ iteration. Nonetheless, the instructions for the repeatable set of operations are still compiled to have 20 iterations. During runtime, a processor may execute the first 5 iterations, and determine after the $5^{th}$ iteration or prior to the $6^{th}$ iteration to exit the loop. The last 15 iterations are still executed by the processor, and the output data that is generated is discarded. The computations performed by the processor during the last 15 iterations are considered to be redundant, as the data has no influence on the final result of the neural network. Such redundant computation is inefficient and decreases workload throughput.

Examples described herein overcome the above-noted inefficiencies in processors, such as SIMD processors, that do not support dynamic control flow. Some examples provide for self-modifying code that, when executed, triggers an overwrite action that overwrites instructions in redundant code blocks with no operation (NOP) instructions (e.g., instructions that do nothing without disrupting the timing mechanisms of the processor). Placing NOP instructions in redundant code blocks can be advantageous because a NOP instruction can be performed in fewer cycles than the instruction that was overwritten. The self-modifying code may be added during the compilation process and may be executed during runtime by an execution engine.

In some examples, the compiler may first detect the presence of a repeatable set of operations having a dynamic length in the source code for a neural network. In some instances, the compiler scans the source code and identifies particular patterns indicative of a repeatable set of operations. For example, the compiler can parse the source code for "for" loops or "while" loops. The compiler then generates instructions having multiple blocks for the repeatable set of operations, each block corresponding to a single iteration, and the total number of blocks corresponding to the maximum number of iterations. The compiler may then generate additional instructions for each of the blocks. The additional instructions may include an evaluation instruction that, when executed, determines whether the break condition is satisfied (e.g., by determining the current value of a variable and comparing the current value to a predetermined value, etc.). The additional instructions may also include an overwrite instruction that, when executed, triggers an overwrite action. The overwrite action may only be triggered when the break condition is satisfied. Accordingly, the evaluation instruction may immediately precede the overwrite instruction or, alternatively or additionally, the overwrite instruction may incorporate the evaluation instruction.

Triggering of the overwrite action causes the instructions in each of the subsequent blocks to be overwritten with NOP instructions. The overwrite action may be carried out using a direct memory access (DMA) engine that transfers NOP instructions to the subsequent blocks immediately upon the execution engine initializing the DMA engine. The segments of instructions that are overwritten is determined by the location of the particular overwrite instruction that triggered the overwrite action. As one example, the compiler may add the additional instructions at the end of a block, and triggering of the overwrite action may cause instructions of each subsequent block to be overwritten. As another example, the compiler may add the additional instructions at the beginning of a block, and triggering of the overwrite action may cause instructions of the current block and of each subsequent block to be overwritten.

In various implementations, an integrated circuit can include an acceleration engine to make use of self-modifying code to reduce the number of computations that the integrated circuit needs to execute in order to perform a task for which the neural network was trained. The integrated circuit can include an array of processing engines for executing parallel, cascading computations. The integrated circuit can further include memory banks, placed local to the array of processing engines (e.g., on the same die), for fast, temporary storage of weight values and instructions for a neural network, and for storing intermediate results. The integrated circuit can further include DMA channels for performing transfers between the memory banks.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates an example of a computational flow model 100 for a neural network. Neural networks take inspiration from the mechanics of the operation of the human brain. According to various models of the brain, the main computational element of the brain is the neuron. Neurons are connected together with a number of elements, with elements entering a neuron being referred to as dendrites and an element leaving a neuron being referred to as an axon. A neuron accepts signals via dendrites, performs a computation on the signals, and outputs a signal on an axon. The input and output signals are referred to as activations. The axon of one neuron can branch out and be connected to the dendrites of multiple neurons. The connection between a branch of an axon and a dendrite is called a synapse.

A synapse can scale the signal crossing the synapse. The scaling factor is referred to as a weight, and is thought of as the way a brain is able to learn: different weights result from different responses to input. Learning can change the weights, but the organization of the neurons and synapses need not change to obtain the learning. The static structure of the brain can thus be used as a model for a program, and the weights can reflect tasks that the program has learned to perform.

Neural networks operate on the notion that a neuron's computation involves a weighted sum of input values. These weighted sums correspond to the value scaling performed by the synapses and the combining of those values in the neuron. A functional operation is performed in the neuron on the combined inputs. In the brain model, the operation appears to be a non-linear function that causes the neuron to generate an output only when the inputs cross some threshold. Thus, by analogy, the nodes of a neural network can apply a non-linear function to the weighted sum of the values input into the nodes.

In the illustrated example, the model 100 includes an input layer 104, a middle layer that is often referred to as a hidden layer 106, and an output layer 108. Each layer includes some number of nodes 102. In this example, the nodes 102 of the input layer 104 are connected to each node 102 of the hidden layer 106. The connections, which would be referred to as synapses in the brain model, are referred to as weights 110. Also in this example, each node 102 of the hidden layer 106 has a connection or weight 110 with each node 102 of the output layer. The input layer 104 can receive inputs and can propagate the inputs to the hidden layer 106. A neural network implementation can include multiple hidden layers. Weighted sums computed by the hidden layer 106 (or multiple hidden layers) are propagated to the output layer 108, which can present final outputs to a user. The outputs of the nodes 102 can be referred to as activations, in keeping with the brain model.

An example of a computation that can occur at each layer in the example model 100 is as follows:

$$y_j = f\left(\sum_{i=1}^{3} W_{ij} \times x_i + b\right)$$

In the above equation, $W_{ij}$ is a weight, $x_i$ is an input activation, $y_j$ is an output activation, $f(\ )$ is a non-linear function, and b is a bias term. Various non-linear functions can be used to achieve different purposes.

The model 100 can be referred to as a directed, weighted graph. In a directed graph, each connection to or from a node indicates a direction (e.g., into the node or away from the node). In a weighted graph, each connection can have a weight. Tools for developing neural networks can visualize the neural network as a directed, weighted graph, for ease of understanding and debuggability. In some cases, these tools can also be used to train the neural network and output trained weight values. Executing the neural network is then a matter of using the weights to conduct computations on input data.

Neural networks with many layers can be capable of learning high-level features having more complexity and abstraction than shallower networks. As an example, a neural network can be taught to recognize images. In this example, pixels of an image can be fed into the input layer of the neural network, and the outputs of the first layer can indicate the presence of low-level features in the image, such as lines and edges. At subsequent layers, these features can be combined to measure the likely presence of higher level features: the lines can be combined into shapes, which can be further combined into sets of shapes. Given all this information, the neural network can output a probability that the high-level features represent a particular object or scene. For example, the neural network can output whether an image contains a cat or does not contain a cat.

The learning phase of a neural network is referred to as training the neural network. During training, the neural network is taught to perform a task. In learning the task, values for the weights (and possibly also the bias) are determined. The underlying program for the neural network (e.g., the organization of nodes into layers, the connections between the nodes of each layer, and the computation executed by each node), does not need to change during training. Once trained, the neural network can perform the task by computing a result using the weight values that were determined during training. For example, the neural network can output the probability that an image contains a particular object, can output the probability that an audio sequence contains a particular word, can generate a bounding box around an object in an image, or can propose an action that should be taken, etc. Running the program for the neural network is referred to as inference.

There are multiple ways in which weights can be trained. One method is called supervised learning. In supervised learning, all training samples are labeled, so that inputting each training sample into a neural network produces a known result. Another method is called unsupervised learning, where the training samples are not labeled and training aims to find a structure in the data or clusters in the data. Semi-supervised learning falls between supervised and unsupervised learning. In semi-supervised learning, a subset of training data is labeled. The unlabeled data can be used to define cluster boundaries and the labeled data can be used to label the clusters.

Neural networks have been used for a variety of applications, including, for example, in the areas of image and video, speech and language, medicine, game play, and robotics. In image and video, neural networks have been used for image classification, object localization and detection, image segmentation, and action recognition. In speech and language, neural networks have been used for speech recognition, machine translation, natural language processing, and audio generation. In the medical field, neural networks have been used in genomics and medical imaging. In game play, neural networks have been used to play video and board games, including games with immense numbers of possible moves such as Go. In robotics, neural networks have been used for motion planning of a robot, visual navigation, control stabilization, and driving strategies for autonomous vehicles.

Figure 2:
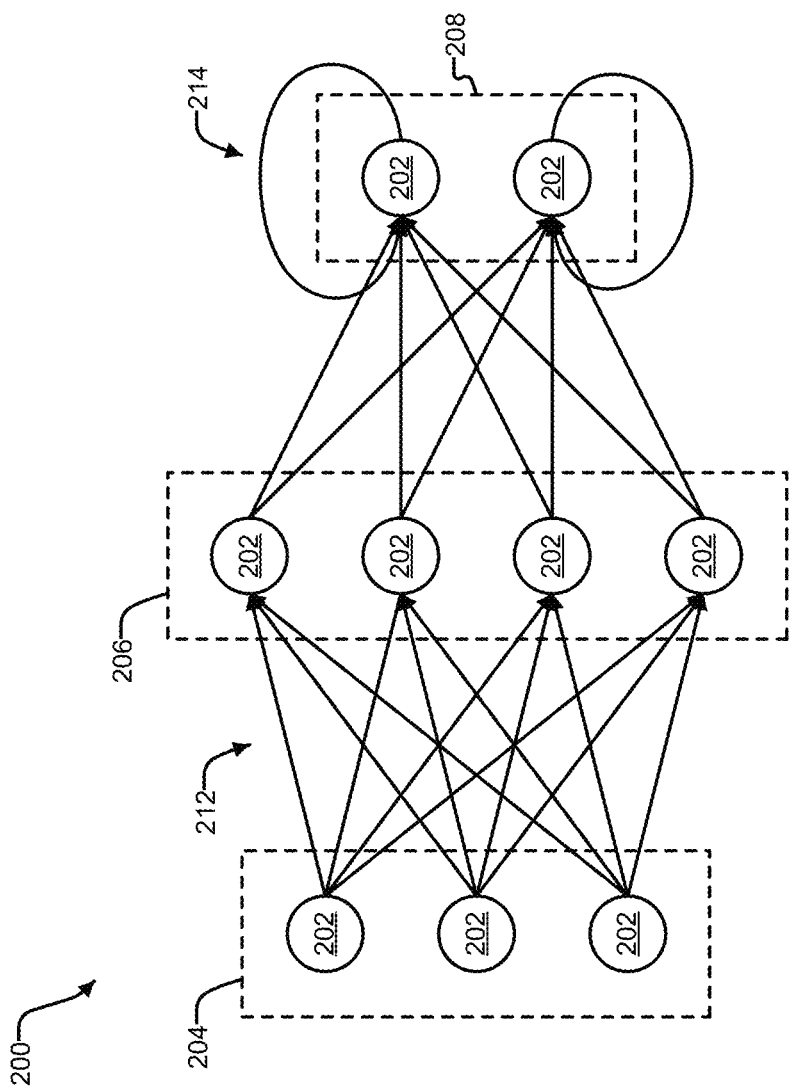
FIG. 2 illustrates an example of a model for a neural network that includes feed-forward weights and recurrent weights.

Different varieties of neural networks have been developed. Various examples of neural networks can be divided into two forms: feed-forward and recurrent. FIG. 2 illustrates an example of a computational flow model 200 for a neural network that includes feed-forward weights 212 between an input layer 204 and a hidden layer 206, and recurrent weights 214 at the output layer 208. In a feed-forward neural network, the computation is a sequence of operations on the outputs of a previous layer, with the final layer generating the outputs of the neural network. In the example illustrated in FIG. 2, feed-forward is illustrated by the hidden layer 206, whose nodes 202 operate only the outputs of the nodes 202 in the input layer 204. A feed-forward neural network has no memory and the output for a given input can be always the same, irrespective of any previous inputs given to the neural network. The Multi-Layer Perceptron (MLP) is one type of neural network that has only feed-forward weights.

In contrast, recurrent neural networks have an internal memory that can allow dependencies to affect the output. In a recurrent neural network, some intermediate operations can generate values that are stored internally and can be used as inputs to other operations, in conjunction with the processing of later input. In the example of FIG. 2, recurrence is illustrated by the output layer 208, where the outputs of the nodes 202 of the output layer 208 are connected back to the inputs of the nodes 202 of the output layer 208. These looped-back connections can be referred to as recurrent weights 214. Long Short-Term Memory (LSTM) is a frequently used recurrent neural network variant.

Figure 3:
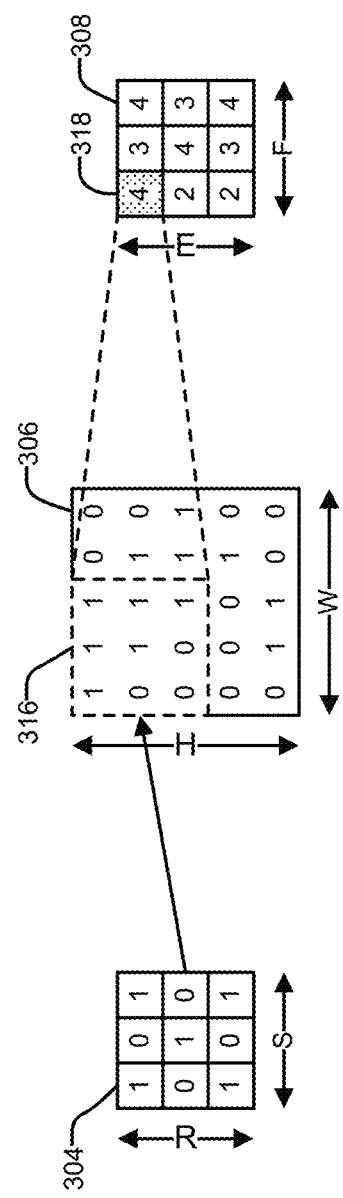
FIG. 3 illustrates an example of a two-dimensional convolution.

FIG. 3 illustrates an example of a two-dimensional convolution, which could be performed during image recognition. In this example, a filter plane 304 is a set of weights arranged in a matrix having a height R and a width S. The values in the filter plane 304 can be selected to filter for particular features, such as lines, edges, curves, corners, blobs, ridges, and so on. The filter plane 304 can also be referred to as a kernel or a feature detector.

The filter plane 304 is applied to a two-dimensional matrix of values that represent the input to the convolution. The two-dimensional matrix is referred to as an input feature map 306. The input feature map 306 can include values for a component of the input. For example, when the input is a color image, the input feature map 306 can include the color values for one color, such as red, for each pixel in the image, with the values indicating an intensity of the color. In this example, additional feature maps can include the other color values for the pixels, one for blue and one for green. In this example, each input feature map is treated as a separate channel. In a black and white image, each pixel value can be represented using a single value that indicates an intensity between white and black. Thus, in some examples, black and white images can be represented using a single channel.

The convolution operation involves computing a value for each possible position of the filter plane 304 over the input feature map 306 by multiplying each filter plane 304 by the corresponding feature map value and summing the result. For example, at a first position 316, multiply each value in the filter plane 304 by each corresponding value in the first position 316 results in a matrix $\{(1, 0, 1), (0, 1, 0), (0, 0, 1)\}$. In this example, the sum of the values in the matrix results in the value 4, which is placed in a corresponding first position 318 in an output feature map 308. A region of values from the input feature map 306 can be referred to as input activations. The result of the multiplication and summation can be referred to as an output activation. The output feature map 308 represents a higher-level abstraction of the input feature map 306, and has a height E and a width F. In various examples, additional filters can be applied to the same input feature map 306 to produce additional output feature maps.

Figure 4:
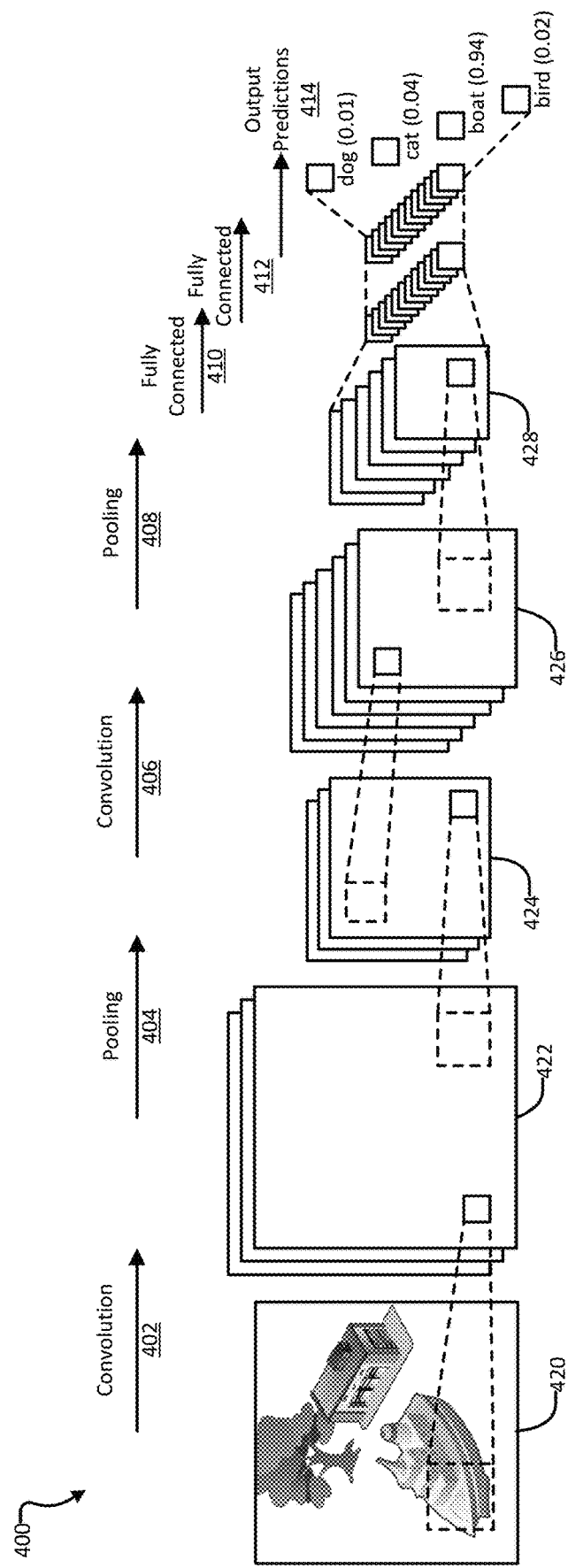
FIG. 4 illustrates an example configuration of a convolutional neural network.

FIG. 4 is an example configuration of a convolutional neural network 400. The example of FIG. 4 illustrates operations that can be included in a convolutional neural network, including convolution, application of non-linearity, pooling or sub-sampling, and output generation (e.g., a fully connected layer). Any given convolutional network includes at least one convolution layer, and can have tens of convolution layers. Additionally, each convolutional layer need not be followed by a pooling layer. In some examples, a pooling layer may occur after multiple convolution layers, or may not occur at all. The example convolution network illustrated in FIG. 4 classifies an input image 420 into one of four categories: dog, cat, boat, or bird. In the illustrated example, on receiving an image of a boat as input, the example neural network outputs the highest probability for "boat" (0.94) among the output predictions 414.

To produce the illustrated output predictions 414, the example convolutional neural network performs a first convolution 402 that can also include application of non-linearity; a first pooling 404 operation; a second convolution 406 that may also include application of non-linearity; a second pooling 408 operation; and then categorization using a first fully-connected 410 layer and a second fully-connected 412 layer. The output of the first convolution 402 is a set of one or more output feature maps 422, which are provided as inputs to the first pooling 404 operation. The first pooling 404 operation produces a set of feature maps 424 that are provided as inputs to the second convolution 406. The second convolution 406 also produces a set of output feature maps 426, which can describe the input image 420 at a more abstract level. The second pooling 408 step also produces feature maps 428, which are input into the first fully-connected 410 layer. The first fully-connected 410 layer accumulates the values in the feature maps 428, and the result is input into the second fully-connected 412 layer. The outputs of the second fully-connected 412 layer are the output predictions 414. FIG. 4 is an example configuration of a convolutional neural network. Other examples can include additional or fewer convolution operations, non-linearity operations, pooling operations, and/or fully-connected layers.

Non-linearity can be added after some convolution operations. Convolution is a linear operation, and in some examples, it is assumed that the real-world data being learned by the convolutional neural network is non-linear. Thus, a non-linear function can be applied, element-wise, to the output feature maps from a convolution. One such non-linear function is provided by a Rectified Linear Unit (ReLU), whose output is given by Output=Max (0, Input). Other non-linear functions may include tan h and sigmoid.

Pooling, which can also be referred to as sub-sampling or down-sampling, can reduce the dimensionality of a feature map while retaining the most important information. Pooling can include, for example, taking a region of values in the matrix of a feature map (e.g., a 2×2 neighborhood, or a neighborhood of another size), and determining a maximum value across the values in the region. Alternatively, average, sum, or another function can be used as the pooling function.

Pooling can be used to progressively reduce the spatial size of the input representation. For example, pooling can make the input representations (e.g., the feature dimension) smaller and more manageable. As another example, pooling can reduce the number of parameters and computations that need to be performed by the neural network. As another example, pooling can make the neural network invariant to small transformations, distortions, or translations in the input image. That is, a small distortion in the input is not likely to change the output of the pooling, since the maximum (or average, or sum, or some other operation) is taken in a local neighborhood. As a further example, pooling can assist in determining an almost scale invariant representation of the image (referred to as an equivariant representation). This means that an object can be detected in an image no matter where the object is located within the image.

As illustrated by the example of FIG. 4, a convolutional neural network can include multiple convolution layers, with each layer refining the features extracted by a previous layer. Each convolution layer may be, but need not be, followed by pooling. The output of a combination of these layers represent high-level features of the input image, such as the presence of certain shapes, colors, textures, gradients, and so on.

To turn these feature maps into a classification, a convolutional neural network can include one or more fully-connected layers. A Multi-Layer Perceptron that uses, for example, a softmax activation function or another logistic function, can be used after a fully-connected layer. A fully-connected layer can classify the input image into various classes based on training data. For example, the convolutional neural network of FIG. 4 was trained to recognize dogs, cats, boats, and birds, and can classify an input image as including one of these classes.

Apart from classification, a fully-connected layer in a convolutional neural network might also provide an inexpensive (in computational and/or data storage terms) way to learn non-linear combinations of the extracted features. The features extracted by the convolution and pooling layers may be good for making a classification, but combination of the features may be better.

In the example of FIG. 4, the sum of the output predictions 414 is 1, due to the output layer using the softmax activation function. The softmax function takes a vector of arbitrary real-valued scores and compresses these values into a vector of values between zero and one that add up to one.

Research has found that the more convolution steps a neural network has, the more features the network will be able to learn to recognize. For example, in an image classification example, in a first layer, the neural network may learn to detect edges from the raw pixels, then in a second layer use the edges to detect shapes, and in a third layer, the neural network may be able to use the shapes to determine higher-level features, such as facial shapes, in higher layers.

In the training of a convolutional neural network, parameters such as the number of filters, the filter sizes, and the organization of the layers remain unchanged. During training, only the values of the filter matrices and connection weights are changed. Once trained, a neural network includes the weights determined during the training and a set of instructions describing the computation to be executed at each layer and/or node of the network. In some examples, the number of weights can be on the order of 5 million to 100 million. In some examples, a weight value can be represented using a 32-bit number, in which case 5 million to 100 million weights can require about 20 megabytes (MB) to 400 MB to store. In some examples, the number of weights can be as few as 1.5 million.

Operation of a neural network (e.g., conducting inference) involves fetching input data or input activations, executing multiply-and-accumulate operations in parallel for each node in a layer, and providing output activations. Optimum performance of a neural network, measured by accuracy and/or response time, can be achieved when a hardware architecture is capable of highly parallelized computations. Central Processing Units (CPUs), which can also be referred to as general purposed processing units, can have multiple cores, (e.g., 2 to 64 or more cores) and can increase parallelism through use of multiple execution threads. CPU cores, however, tend to be optimized for sequential processing. For example, a computation engine (e.g., an arithmetic logic unit (ALU)) of a core obtains operands from memory and writes a result to memory, such that memory operations are required for sequential computations. In this example, each memory operation can require management by control logic of the CPU. For this and other reasons, CPUs tend to have slow response times when performing inference for a neural network.

In contrast to CPUs, Graphics Processing Units (GPUs) achieve parallelism by having thousands of small and efficient cores, configured specifically for conducting parallel computations. GPUs thus can achieve far better performance than a CPU when executing a neural network. Individual GPU computation engines, however, can still be primarily sequential in nature, such that memory operations are required for the outputs of one computation engine to be provided to the inputs of another.

Special-purpose acceleration engines can achieve better performance than both CPUs and GPUs when executing a neural network. Acceleration engines can employ a spatial architecture, in which computation engines form processing chains and can pass data directly from one computation engine to another. This can significantly reduce the number of memory transactions needed to conduct inference. In some examples, acceleration engines can also include an on-chip buffer that can store values read from processor memory, and that can distribute values to multiple computation engines in the acceleration engine. The computation engines can further include a small, local register file (e.g., a small memory) for storing intermediate results. Having an on-chip memory hierarchy can improve the efficiency of the operation of a neural network by reducing memory latencies.

Figure 5:
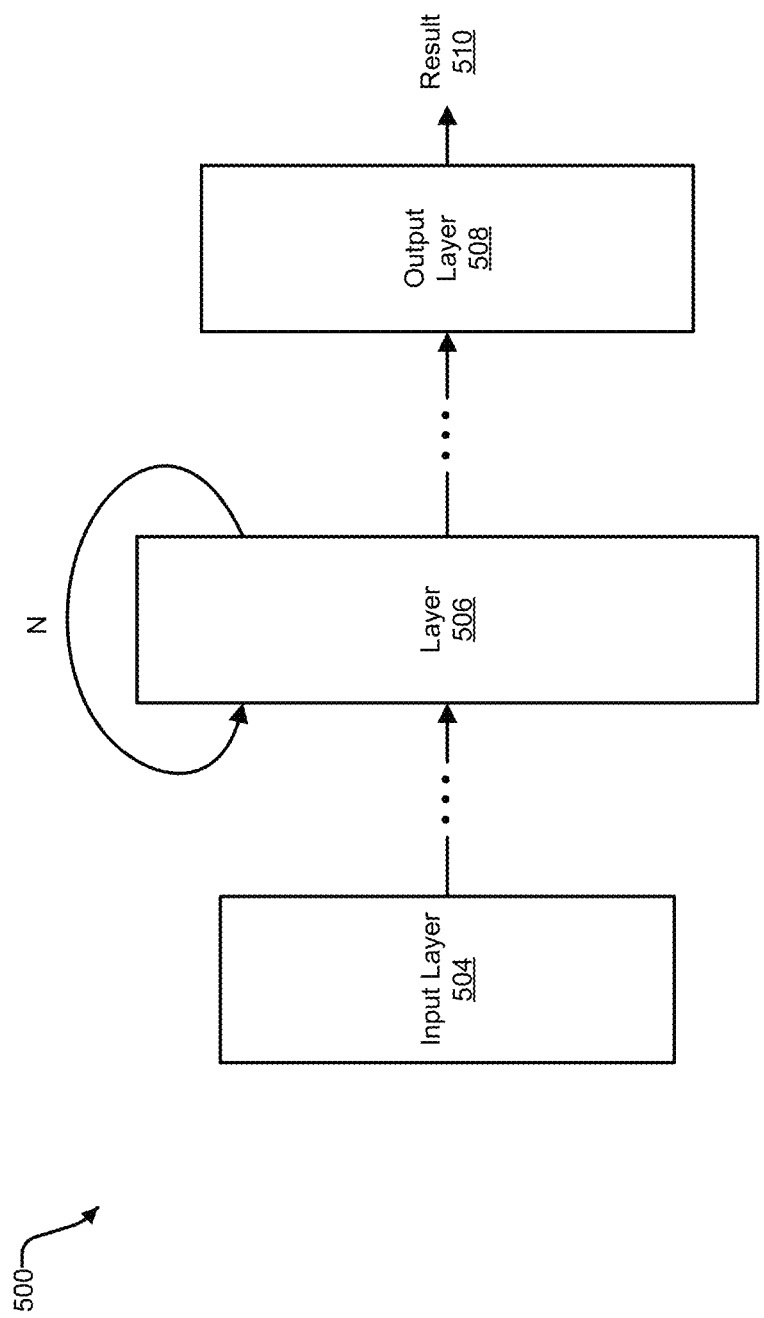
FIG. 5 illustrates an example of an organization for a neural network.

FIG. 5 illustrates a simplified example of the organization of a neural network 500. The neural network 500 of this example includes an input layer 504, a hidden layer 506, and an output layer 508, which produces a result 510. The layer 506 can include a repeatable set of operations that are performed N times. During the first iteration, the output data from the preceding layer (e.g., the input layer 504) can be used as the input data for the layer 506. During subsequent iterations, the output data from the preceding iteration can be used as the input data for the layer 506. After the last iteration, the output data is fed into the subsequent layer (e.g., the output layer 508). The layer 506 may include a break condition that, when satisfied, causes the layer 506 to stop repeating and the output data of the current layer to be fed into the subsequent layer. The layers of the neural network 500 can be fully connected layers, sparsely connected, and/or can include recurrent weights.

Figure 6:
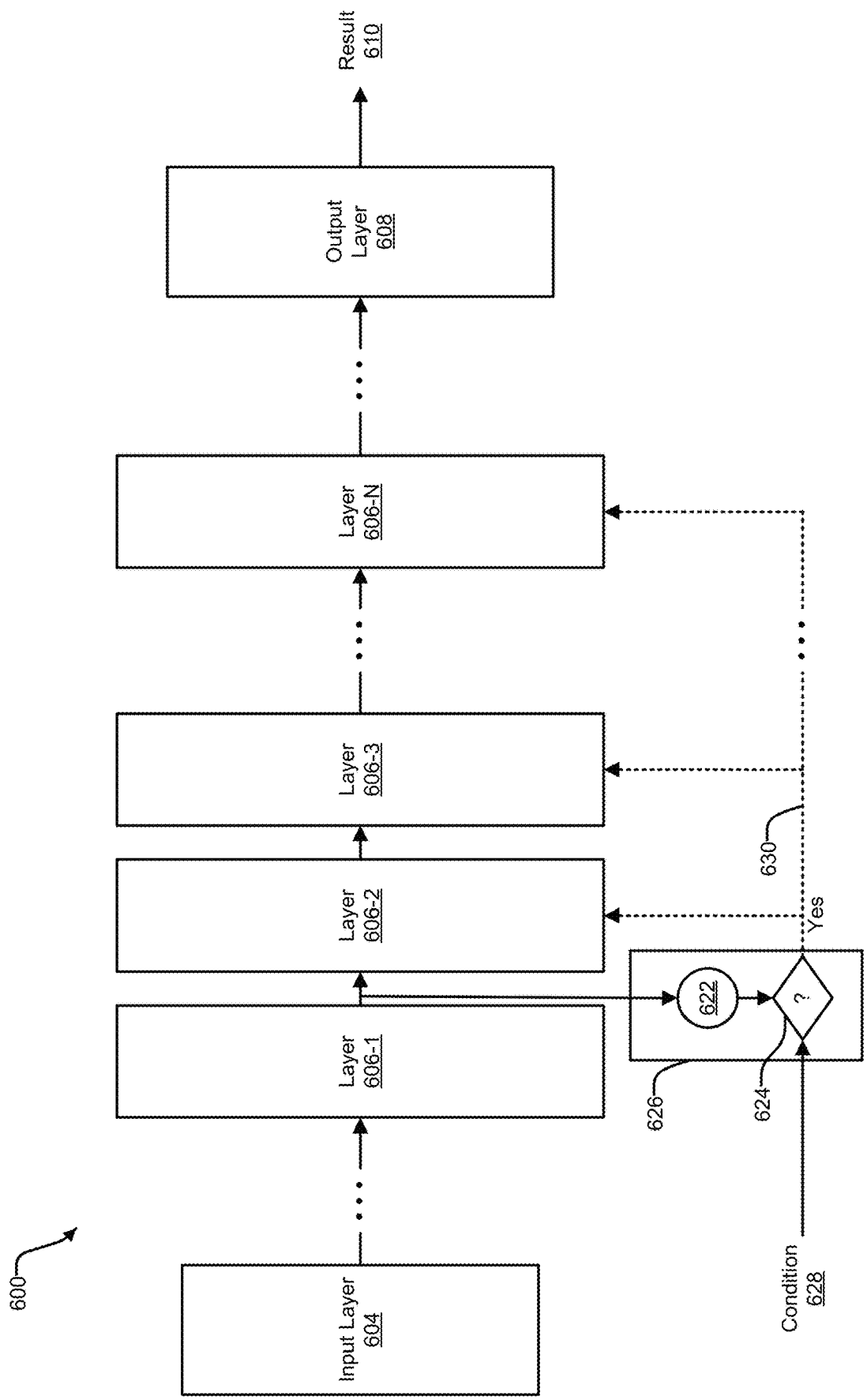
FIG. 6 illustrates another example of an organization for a neural network.

FIG. 6 illustrates a simplified example of the organization of a neural network 600. The neural network 600 may be similar to the neural network 500. For example, the neural network 600 may be an unrolled version of the neural network 500, illustrating each of the iterations of the layer 506. The neural network 600 of this example includes an input layer 604, unrolled hidden layers 606, and an output layer 608, which produces a result 610. The hidden layers 606 may include a first layer 606-1, a second layer 606-2, a third layer 606-3, through an $N^{th}$ layer 606-N. The layer 606-2 receives as input the output of the layer 606-1, the layer 606-3 receives as input the output of the layer 606-2, and the like. Each of the layers 606 can include the same set of operations, such as convolutional operations, non-linearity, and/or pooling. Alternatively or additionally, the layers can be fully connected, sparsely connected, and/or can include recurrent weights.

The example neural network 600 also includes an intermediate operation between the layer 606-1 and the layer 606-2, which can be grouped into what is referred to herein as a conditional layer 626. In various implementations, the conditional layer 626 can include a function 622 for computing an intermediate result from the outputs of the layer 606-1 or from a variable associated with the layer 606-1. Execution of the conditional layer 626 can further include testing 624 the result computed by the function 622 against a break condition 628. When testing 624 determines that the break condition 628 is not satisfied by the result, an overwrite action 630 is not triggered and execution of the neural network proceeds with the layer 606-2 and continues to the output layer 608. When testing 624 determines that the break condition 628 is satisfied, in this example, the overwrite action 630 is triggered, causing the layers 606-2 through 606-N to be modified as described herein.

The function 622 used in the conditional layer 626 can include a logistic function, such as softmax. The softmax function combines the values in a vector of arbitrary values to a vector of values in the range of (0, 1) that add up to 1. The output of the softmax function can be used to represent a categorical distribution. Some or all of the outputs of the layer 606-1 can be input into softmax to produce a result. In various examples, other logistic functions can be used.

The break condition 628 can describe circumstances under which the result of the function 622 satisfies the break condition. For example, the break condition 628 can include a test value, against which the result is tested. Additionally, in some implementations, the condition 628 can include a test that is to be applied at the testing 624 step. For example, the test can be to compare the result against the test value, and when the result is greater than (or less than, or equal to, or not equal to, or some other comparison) the test value, then the break condition is met. For example, the break condition 628 can provide a test value of 90%, and indicate that, when the result indicates a greater than 90% probability, then the break condition 628 is satisfied.

In some examples, the function 622 outputs a set of values. For example, softmax can output a vector. In these examples, the break condition 628 can be that one or more values from the set of values should meet a condition. For example, the five largest values from the set (or the two largest, or seven largest, or some other number of largest values) can be summed, and the testing 624 can determine whether the sum meets the condition. For example, the testing 624 can determine whether the sum is greater than a threshold value. In these and other examples, the condition can be less stringent than when only the largest value from the set is tested against the condition.

In some implementations, the test value and/or the test being applied can be specified separately from the definition of the neural network. For example, an acceleration engine can include a register or set of registers which can store the test value, a test, and/or to which conditional layer 626 the test value and/or test applies. In some examples, the acceleration engine can include a test value and/or test for each conditional layer 626, or for all conditional layers. In some examples, the acceleration engine can include separate test values and/or tests for each task the neural network is trained to perform.

Figure 7:
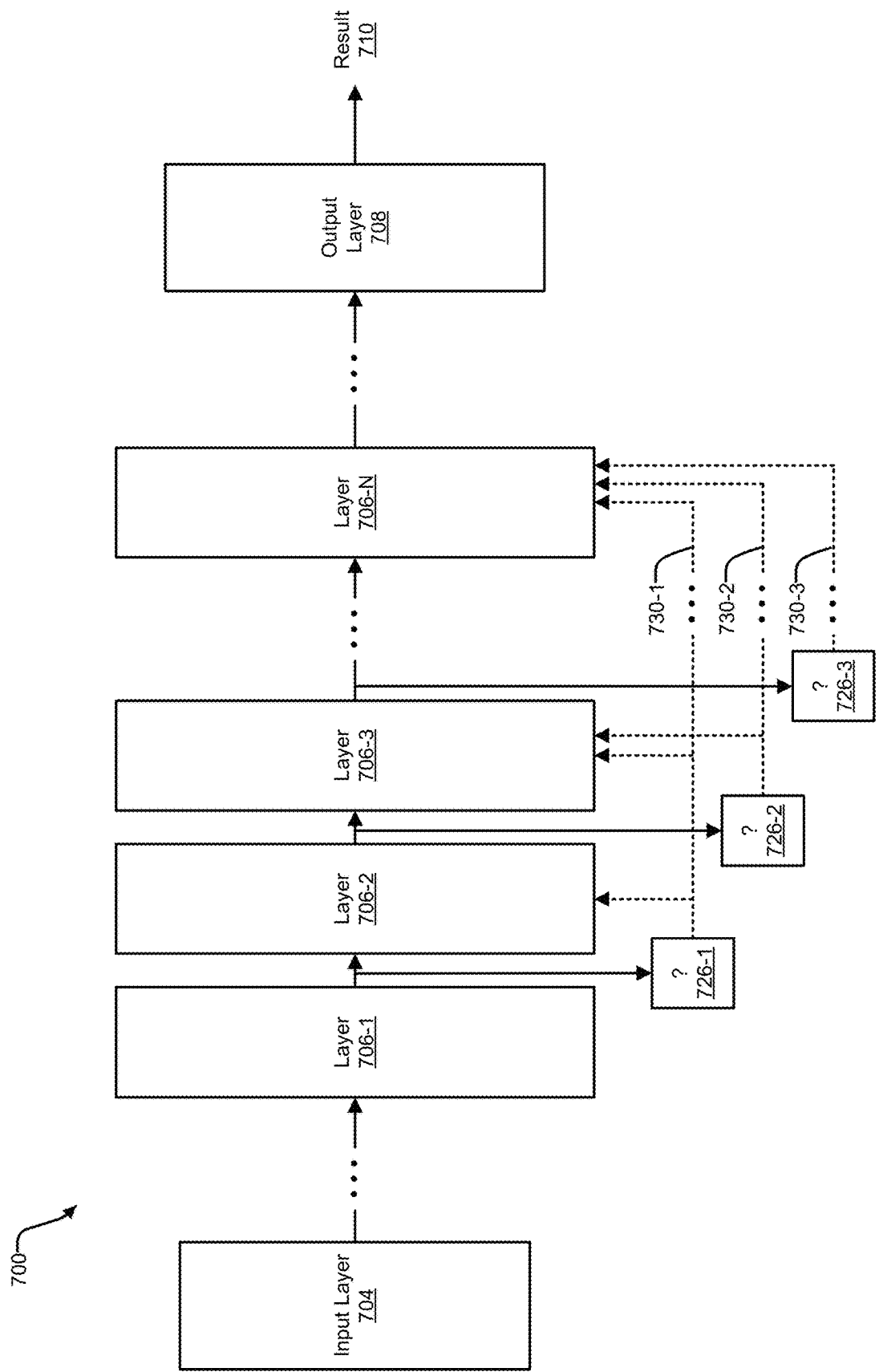
FIG. 7 illustrates a further example of an organization for a neural network.

FIG. 7 illustrates a simplified example of the organization of a neural network 700. The neural network 700 may be similar to the neural networks 500 and 600. The neural network 700 includes an input layer 704, hidden layers 706, and an output layer 708, which produces a result 710. The layers 706 may include a first layer 706-1, a second layer 706-2, a third layer 706-3, through an $N^{th}$ layer 706-N. The example neural network 700 of FIG. 7 includes multiple conditional layers 726 positioned between each of the layers 706 and multiple overwrite actions 730. For example, a first conditional layer 726-1 may be positioned between the layers 706-1 and 706-2 and may trigger a first overwrite action 730-1, a second conditional layer 726-2 may be positioned between the layers 706-2 and 706-3 and may trigger a second overwrite action 730-2, and the like. In some examples, the conditional layers 726 may be incorporated into the layers 706. For example, the conditional layer 726-1 may be incorporated into the layer 706-1 and the conditional layer 726-2 may be incorporated into the layer 706-2, and the like.

Figure 8:
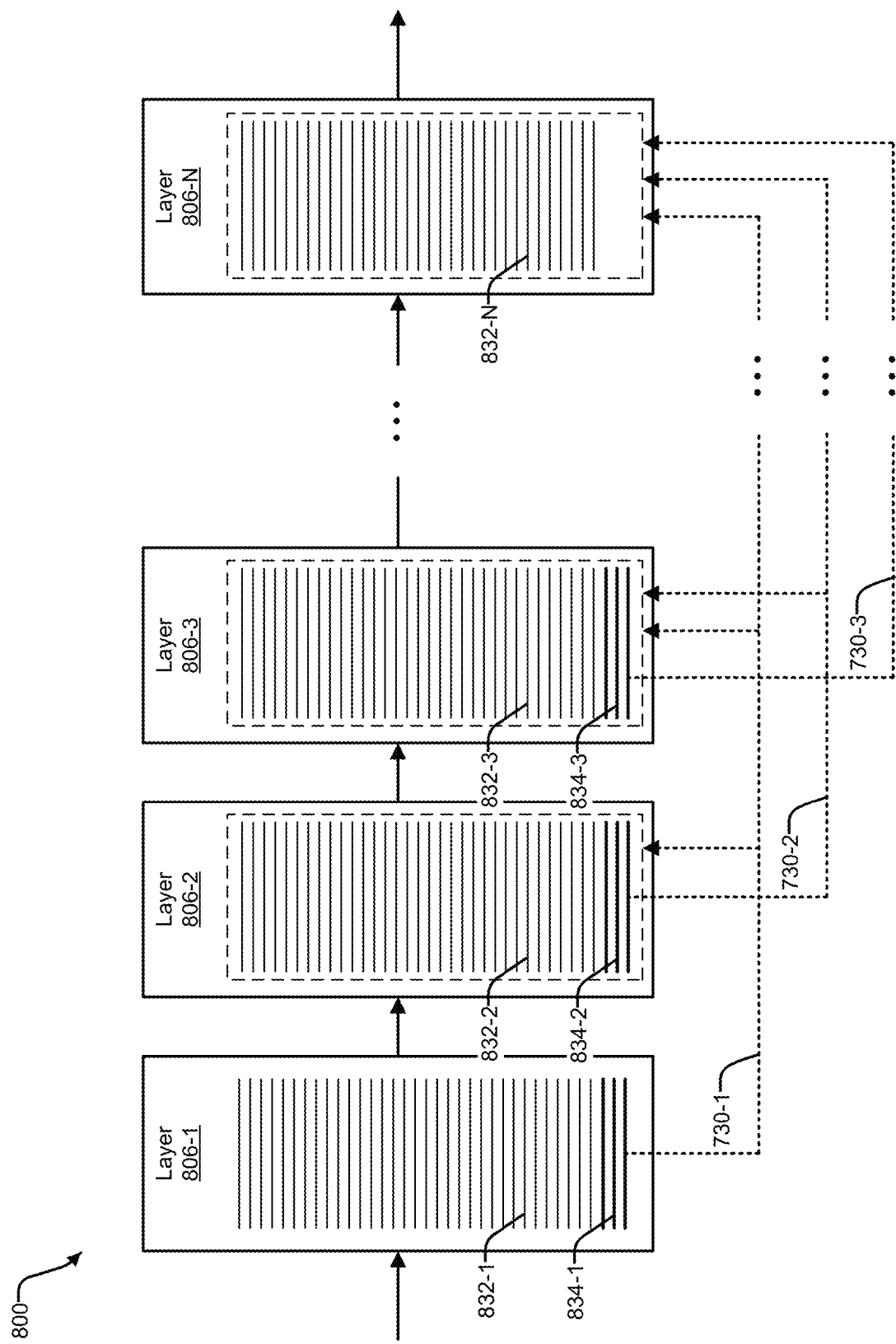
FIG. 8 illustrates an example of a neural network and its associated instructions.

FIG. 8 illustrates an example neural network 800 and the associated instructions corresponding to different layers 806 of the neural network 800. The neural network 800 may be similar to the neural networks 500, 600, and 700. The layers 806 may include a first layer 806-1, a second layer 806-2, a third layer 806-3, through an $N^{th}$ layer 806-N. When the neural network 800 is compiled into instructions, the compiler may generate N blocks of instructions for the layers 806. Each of the blocks of instructions may include instructions 832 corresponding to the repeatable set of operations and additional instructions 834 may correspond to the conditional layers 626 and 726 described in reference to FIGS. 6 and 7. In some examples, the additional instructions 834 contain an evaluation instruction and an overwrite instruction. For each block of instructions, the compiler may add/insert the additional instructions 834 before, after, or in the middle of the instructions 832. In the illustrated embodiment, the additional instructions 834 are added after the instructions 832 for each block except for the last block, which does not contain any additional instructions 834.

In one example, during runtime, an execution engine may execute the instructions 832-1 to perform the set of operations on the input data. The execution engine may then execute the evaluation instruction of the additional instructions 834-1, causing the execution engine to determine whether the break condition is satisfied. If it is determined that the break condition is satisfied, then the overwrite action 730-1 is triggered, causing the instructions 832-2 through 832-N to be overwritten with NOP instructions. In some examples, the additional instructions 834 of subsequent blocks may also be overwritten with NOP instructions. If it is determined that the break condition is not satisfied, then the overwrite action 730-1 is not triggered and the execution engine continues executing instructions.

Continuing with the above example, assuming the overwrite action 730-1 was not triggered, the execution engine may then execute the instructions 832-2 to perform the set of operations on the output data of the layer 806-1 that was generated by the instructions 832-1. The execution engine may execute the evaluation instruction of the additional instructions 834-2, causing the execution engine to determine whether the break condition is satisfied. If it is determined that the break condition is satisfied, then the overwrite action 730-2 is triggered, causing the instructions 832-3 through 832-N to be overwritten with NOP instructions. If it is determined that the break condition is not satisfied, then the overwrite action 730-2 is not triggered and the execution engine continues executing instructions.

Continuing with the above example, assuming the overwrite actions 730-1 and 730-2 were not triggered, the execution engine may then execute the instructions 832-3 to perform the set of operations on the output data of the layer 806-2 that was generated by the instructions 832-2. The execution engine may execute the evaluation instruction of the additional instructions 834-3, causing the execution engine to determine whether the break condition is satisfied. If it is determined that the break condition is satisfied, then the overwrite action 730-3 is triggered, causing the instructions 832-4 (not shown) through 832-N to be overwritten with NOP instructions. If it is determined that the break condition is not satisfied, then the overwrite action 730-3 is not triggered and the execution engine continues executing instructions.

Figure 9:
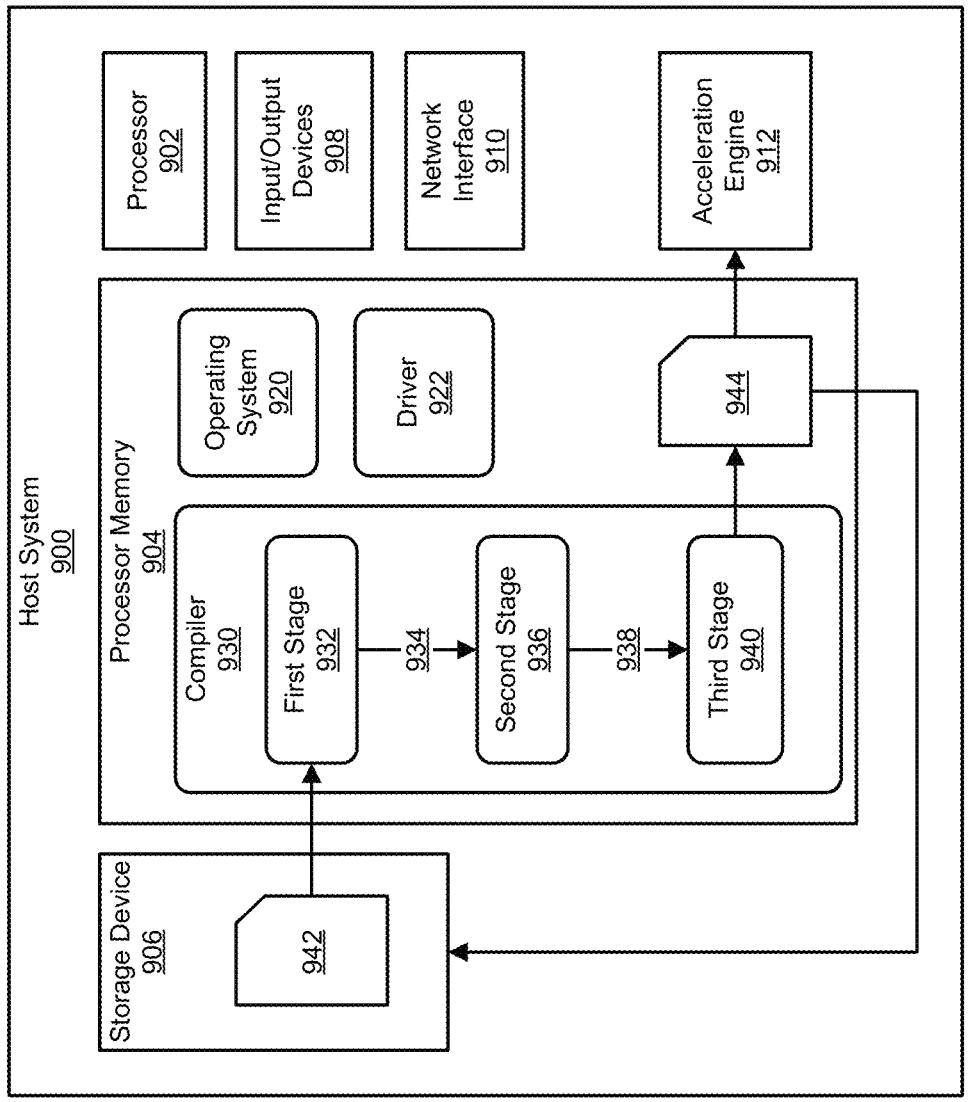
FIG. 9 illustrates an example of a host system in which an acceleration engine can be used.

FIG. 9 includes a block diagram illustrating an example of a host system 900 on which a compiler 930 can run. The illustrated host system 900 is an example of a computing device, and includes a processor 902, a processor memory 904, at least one storage device 906, various Input/Output (I/O) devices 908, and at least one network interface 910. In the example of FIG. 9, the host system 900 also includes an acceleration engine 912, which is an integrated circuit device that can accelerate certain operations or computations performed by the host system 900. In various examples, the host system 900 can be implemented as a server in a data center, a desktop computer, a laptop computer, a tablet computer, or a smartphone, among other examples. In some examples, operations or components discussed below as performed or included in the host system 900 can be performed or included in other computer devices. For example, the compiler 930 can execute on the host system 900 while the acceleration engine 912 is located at a different host system.

The processor 902 is an integrated circuit device that can execute program code, in the form of instructions. The program code can be used for various software applications or tools, such as an operating system 920. While the processor 902 is executing a program, the instructions for the program can be stored in the processor memory 904. The instructions can also be stored elsewhere, such as on the storage device 906, and can be loaded into the processor memory 904 when needed by the processor 902. The processor 902 can also use the processor memory 904 for temporary storage of other data on which the processor 902 is operating. In various examples, the processor memory 904 is a volatile memory type, such as a type of Random Access Memory, though non-volatile memory types can, alternatively or additionally, be used for the processor memory 904.

The storage device 906 is an example of a device that can include non-volatile memory. For example, the storage device 906 can be a magnetic disk drive, a solid state drive, or an optical drive, among other examples. The storage device 906 can further be non-transitory, such that program code and other data stored on the storage device 906 remains present when the storage device 906 is not powered on.

The storage device 906 is one example of a peripheral device, which are components that can be coupled to the host system 900 to add functionality to the host system 900. Other examples of peripheral devices include the Input/Output devices 908 and the network interface 910. The Input/Output devices 908 can include user input and output devices, such as keyboards, mice, touch screens, microphones, display screens, speakers, printers, and scanners, among other examples. The network interface 910, which can be implemented using a network interface card, can provide access to one or more networks. The network interface 910 can include, for example, a physical port for connecting a network cable and/or wireless antennas for communicating with Wi-Fi and/or cellular networks. The network interface 910 can also be described as an I/O device.

The acceleration engine 912 is also another type of peripheral device or I/O device. The acceleration engine 912 is a device that is purpose built to perform certain operations that can be performed by the processor 902, but can be performed faster by the acceleration engine 912. For example, the acceleration engine 912 can be a neural network accelerator, and, as such, may be able to perform the large scale, parallel computations of a neural network more efficiently than when the computations are performed by the processor 902. As another example, the acceleration engine 912 can be a graphics processing unit (GPU), and may be optimized to perform the computations needed for graphics rendering. Other examples of devices that can be implemented by the acceleration engine 912 include cryptographic accelerators, compression and decompression accelerators, 3-D accelerators, regular expression accelerators, security accelerators, and others.

In various examples, the acceleration engine 912 can execute program code to perform certain operations. For example, when the acceleration engine 912 is a neural network accelerator, the acceleration engine 912 can be programmed to execute a particular neural network, such as one that performs image recognition or one that performs machine translation. As a further example, to support the execution of a neural network, the acceleration engine 912 can be programmed to perform operations such as copying data for the neural network from processor memory 904 (for example) into the acceleration engine 912, copying input data for the neural network from processor memory 904 into the acceleration engine 912, and/or copying results from the acceleration engine 912 into the processor memory 904, among other examples.

To generate program code for the acceleration engine 912, in various examples, the host system 900 can execute the compiler 930. Compilers, in general, are software programs that translate program code written in a human-readable language into a format (e.g., machine instructions) that can be read and processed by an integrated circuit device. In the example of FIG. 9, the acceleration engine 912 is a neural network accelerator and the compiler 930 is for compiling a neural network description into instructions to be executed on the acceleration engine 912. When the acceleration engine 912 implements a different type of accelerator, another compiler can be used.

The compiler 930 can be activated, for example, when the operating system 920 receives keyboard, mouse, touchscreen, voice commands, or other inputs from the Input/Output devices 908. The inputs can further include parameters for the compiler 930, such as the input code 942 to compile and configure options for the compilation process. Once the compiler 930 is activated, the processor 902 can load the instructions for the compiler 930 into the processor memory 904, and can execute the instructions.

In the example of FIG. 9, the compiler 930 includes a first stage 932, a second stage 936, and a third stage 940, which each perform different operations to produce compiled code 944. In other examples, the compiler 930 can combine the operations of the first stage 932, second stage 936, and/or third stage 940 into fewer stages, or can divide the operations of one of the stages into multiple stages.

The first stage 932 can receive and process input code 942. The input code 942 can describe a program in a high-level programming language, such as Java, C++, or Tensorflow, among many other examples. The input code 942 can describe, for example, steps to perform image recognition, speech recognition, machine translation, or other operations. The input code 942 can be obtained, for example, from the storage device 906. Alternatively, though not illustrated here, the input code 942 may be located in the processor memory 904 or can be obtained from a network location, using the network interface 910. Processing of the input code 942 can include sorting the operations described in the input code 942 into layers, where the outputs of one layer provide the inputs to a next layer. Processing can also include identifying steps to be performed by the processor 902, rather than by the acceleration engine 912. For example, the processor 902, through the execution of a driver 922, may need to perform steps such as configuring DMA descriptors for moving data into or out of the acceleration engine 912, among other examples.

The output 934 of the first stage 932 can be organized, for example, in the layers, nodes, and connections between nodes of a neural network. The second stage 936 can perform intermediate processing on this output 934. For example, the operations performed in any one layer, or at any one node in a layer, may be too many for the acceleration engine 912 to perform at the same time. The acceleration engine 912 may, for example, have a limited amount of local storage space for the data needed for a computation, or the computations may be more than the acceleration engine 912 can perform at one time. In this example, the first stage 932 can break the operations of the layer or node down into smaller operations, which can fit into the acceleration engine's local memory and/or can fit into the computing capacity of the acceleration engine 912. Processing of the output 934 of the first stage 932 can include other steps, such as scheduling, or determining the order in which the acceleration engine 912 and/or processor 902 will perform operations, among other examples.

In various examples, the output 938 of the second stage 936 includes the various steps to be performed by components of the acceleration engine 912, in the order that the steps are to be performed. The output 938 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

The third stage 940 can operate on the output 938 of the second stage 936, and perform various steps before producing the instructions that are to be executed by the acceleration engine 912. These steps can include, for example, removing redundant dependencies, resolving or handling dependencies between nodes by inserting synchronization instructions into the code, identifying possible optimizations in memory usage or memory bandwidth usage, and other operations.

The output of the third stage 940 is compiled code 944, which may include machine instructions in binary format. In some examples, the compiled code 944 can be stored in the processor memory 904. Alternatively or additionally, the compiled code 944 can be copied to the storage device 906 or to a network location. As noted above, the acceleration engine 912 may be located at a different host system, in which case the compiled code 944 can be sent over the network interface 910 to the other host system.

In the example of FIG. 9, the host system 900 can execute a driver 922, which can also be referred to as a device driver or runtime driver, that manages the acceleration engine 912. The driver 922 can provide an interface between applications executing on the host system 900 (or on another host system) and the acceleration engine 912. For example, the driver 922 can provide an Application Program Interface (API) that defines functions for feeding input data to the acceleration engine 912 and defining the operation to perform on the input data. In this and other examples, the driver 922 can configure the acceleration engine 912 to perform the operation. For example, the driver 922 can identify a neural network that the acceleration engine 912 is to execute, as well as the location in the processor memory 904 or on the storage device 906 where the compiled code 944 for the neural network is located. The driver 922 can further load into the acceleration engine 912 or cause the acceleration engine 912 to load the compiled code 944, can load or cause the acceleration engine 912 to load the input data on which the neural network is to operate, and/or can cause the acceleration engine 912 to begin executing on the input data. Once the acceleration engine 912 has finished, the acceleration engine 912 can notify the driver 922, and the driver 922 can deliver a result back to the application that requested the result.

Figure 10:
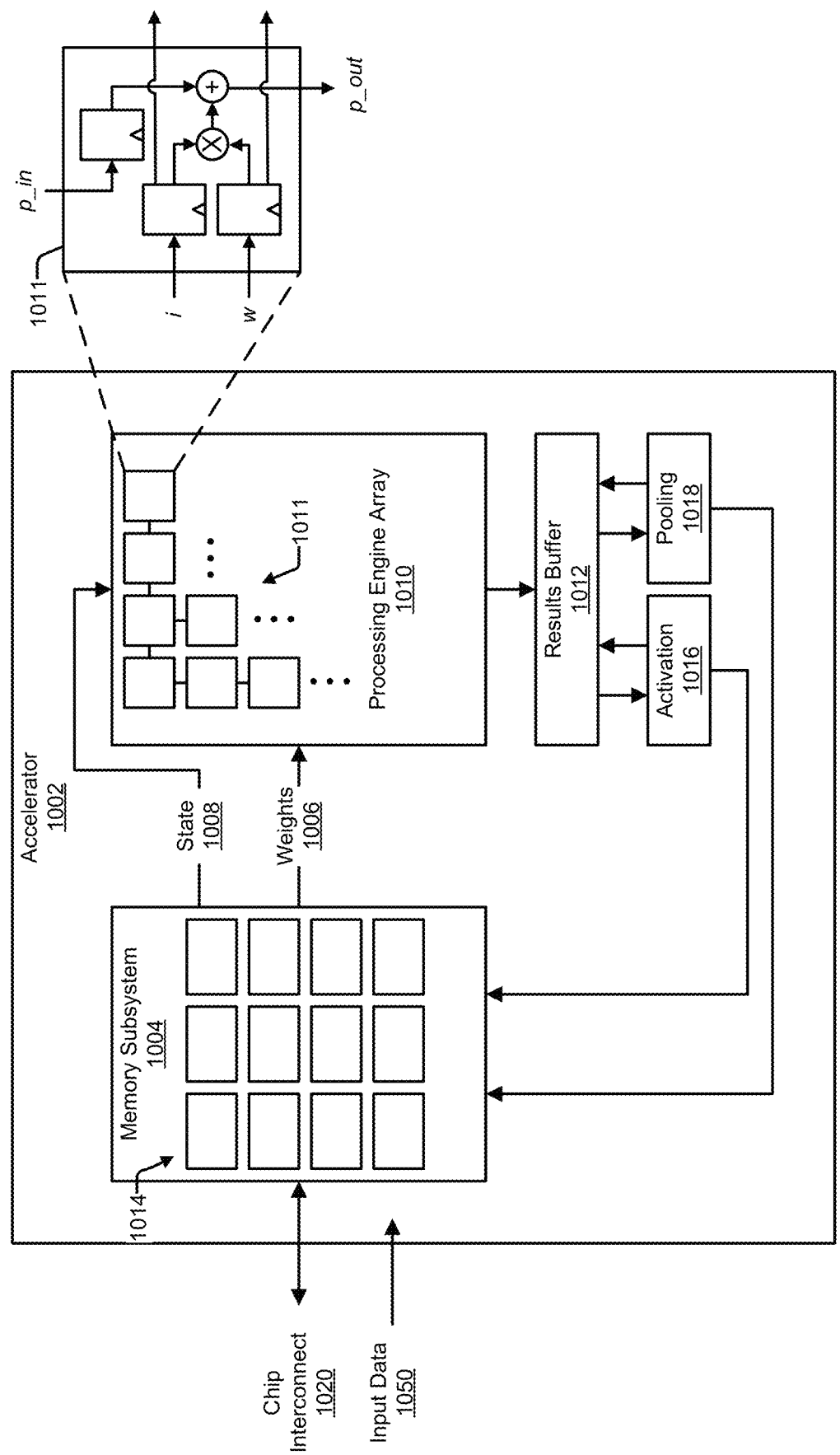
FIG. 10 illustrates an example of an accelerator that can be used to execute a neural network.

FIG. 10 illustrates an example of an accelerator 1002 of an acceleration engine. In various implementations, the accelerator 1002, for a set of input data, can execute a neural network to perform a task the neural network was trained for (e.g., conduct inference), including executing conditional layers. In various implementations, the example accelerator 1002 is an integrated circuit component of an acceleration engine. The accelerator can have other integrated circuit components, including additional acceleration engines. In various implementations, the accelerator 1002 can include a memory subsystem 1004 and a processing engine array 1010. When in operation (e.g., when computing a result for a set of input data 1050), the processing engine array 1010 can read weight 1006 and state 1008 values from the memory subsystem 1004. The processing engine array 1010 can output computation results to a results buffer 1012. In some cases, the example accelerator 1002 can perform an activation function (using an activation 1016 block) and/or pooling (using a pooling 1018 block) on the results from the processing engine array 1010, before the results are written to the memory subsystem 1004.

Weights 1006, in this example, are the weight values for a neural network. In various implementations, the weights 1006 are post-training weights, meaning that values for the weights 1006 were previously determined. State 1008, in this example, can include input data 1050 when a computation begins, as well as intermediate values that reflect an in-progress computation. State 1008, for example, can include partial sums determined by the processing engine array 1010. State 1008 can also include instructions for the processing engine array 1010, where the instructions may be associated with a particular layer. The instructions can, for example, instruct the processing engine array 1010, and possibly also the activation 1016 and/or pooling 1018 blocks, to execute a certain computation. The weights 1006 and the state 1008 can be read from the memory subsystem 1004 for operating on by the processing engine array 1010. In some examples, the memory subsystem can also include a separate memory or buffer for instructions.

In various implementations, the memory subsystem 1004 can include multiple memory banks 1014. In these implementations, each memory bank 1014 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 1014. For example, each memory bank can have at least one read channel and may have at least one separate write channel that can be used at the same time. In these examples, the memory subsystem 1004 can permit simultaneous access to the read or write channels of multiple memory banks. As another example, the memory subsystem 1004 can include arbitration logic such that arbitration between, for example, the outputs of multiple memory banks 1014 can result in more than one memory bank's output being used. In these and other examples, though globally managed by the memory subsystem 1004, each memory bank can be operated independently of any other.

Having the memory banks 1014 be independently accessible can increase the efficiency of the accelerator 1002. For example, weights 1006 and state 1008 can be simultaneously read and provided to each row of the processing engine array 1010, so that the entire processing engine array 1010 can be in use in one clock cycle. As another example, weights 1006 and state 1008 can be read at the same time that intermediate results are written to the memory subsystem 1004. In contrast, a single memory, while still able to provide weights 1006 and state 1008 to the processing engine array 1010 faster than off-chip memory, may be able to service only one read or write at a time. With a single memory, multiple clock cycles can be required, for example, to read weights for each row of the processing engine array 1010 before the processing engine array 1010 can be started.

In various implementations, the memory subsystem 1004 can be configured to simultaneously service multiple clients, including the processing engine array 1010, the activation 1016 block, the pooling 1018 block, and any external clients that access the memory subsystem 1004 over a chip interconnect 1020. In some implementations, being able to service multiple clients can mean that the memory subsystem 1004 has at least as many memory banks as there are clients. In some cases, each row of the processing engine array 1010 can count as a separate read client. In these cases, weights 1006 and state 1008 can be stored separately, and thus require two reads, or can be concatenated and stored together, thus requiring one read. In some cases, each column of the processing engine array 1010 can output an intermediate value, such that each column can count as a separate write client. In some cases, output from the processing engine array 1010 can be written into the memory banks 1014 that can then subsequently provide input data for the processing engine array 1010. The memory banks 1014 can be implemented, for example, using static random access memory (SRAM).

In various implementations, the memory subsystem 1004 can include control logic. The control logic can, for example, keep track of the address spaces of each of the memory banks 1014, identify memory banks 1014 to read from or write to, and/or move data between memory banks 1014, if needed. In some implementations, the memory subsystem 1004 can include multiplexors for selecting which memory bank to output to a particular client and/or to receive input from a particular client. In these implementations, the control logic can generate select signals for the multiplexors, which can enable some or all of the memory banks 1014 to service each client. In some implementations, memory banks 1014 can be hardwired to particular clients. For example, a set of memory banks 1014 can be hardwired to provide weights 1006 and state 1008 to the rows of the processing engine array 1010. In these examples, the control logic can move data between memory banks 1014, for example, to move intermediate results from the memory banks 1014 to which the intermediate results are written, to the memory banks 1014 from which the intermediate results will be read for the next round of computation.

The processing engine array 1010 is the computation matrix of the accelerator 1002. The processing engine array 1010 can, for example, execute parallel integration, convolution, correlation, and/or matrix multiplication, among other things. The processing engine array 1010 includes multiple processing engines 1011, arranged in rows and columns, such that results output by one processing engine 1011 can be input directly into another processing engine 1011. Processing engines 1011 that are not on the outside edges of the processing engine array 1010 thus can receive data to operate on from other processing engines 1011, rather than from the memory subsystem 1004.

In various examples, the processing engine array 1010 uses systolic execution, in which data arrives at each processing engine 1011 from different directions at regular intervals. In some examples, input data can flow into the processing engine array 1010 from the left and weight values can be loaded at the top. In some examples weights and input data can flow from the left and partial sums can flow from top to bottom. In these and other examples, a multiply-and-accumulate operation moves through the processing engine array 1010 as a diagonal wave front, with data moving to the right and down across the array. Control signals can be input at the left at the same time as weights 1006, and can flow across and down along with the computation.

In various implementations, the number of columns in the processing engine array 1010 determines the computational capacity of the processing engine array 1010, and the number of rows determines the required memory bandwidth for achieving maximum utilization of the processing engine array 1010. The processing engine array 1010 can have, for example, 64 columns and 256 rows, or some other number of columns and rows.

An example of a processing engine 1011 is illustrated in FIG. 10 in an inset diagram. As illustrated by this example, a processing engine 1011 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 1011.

In the illustrated example, an input from above can include a partial sum, p_in, provided either from another processing engine 1011 or from a previous round of computation by the processing engine array 1010. When starting a computation for a new set of input data, the top row of the processing engine array 1010 can receive a fixed value for p_in, such as zero. As illustrated by this example, i and w are multiplied together and the result is summed with p_in to produce a new partial sum, p_out, which can be input into another processing engine 1011. Various other implementations of the processing engine 1011 are possible.

Outputs from the last row in the processing engine array 1010 can be temporarily stored in the results buffer 1012. The results can be intermediate results, which can be written to the memory banks 1014 to be provided to the processing engine array 1010 for additional computation. Alternatively, the results can be final results, which, once written to the memory banks 1014 can be read from the memory subsystem 1004 over the chip interconnect 1020, to be output by the system.

In some implementations, the accelerator 1002 includes an activation 1016 block. In these implementations, the activation 1016 block can combine the results from the processing engine array 1010 into one or more output activations. For example, for a convolutional neural network, convolutions from multiple channels can be summed to produce an output activation for a single channel. In other examples, accumulating results from one or more columns in the processing engine array 1010 may be needed to produce an output activation for a single node in the neural network. In some examples, activation 1016 block can be bypassed.

In some implementations, the accelerator 1002 can include a pooling 1018 block. Pooling is the combining of outputs of a cluster of nodes from a layer of a neural network. The combined output can be provided to the next layer. Combining can include for example, computing a maximum value, a minimum value, an average value, a median value, or some other value determined from the outputs of the cluster of nodes. In various examples, the pooling 1018 can be selectively activated, as needed for any particular neural network.

In various implementations, instructions provided to the processing engine array 1010 can include instructions for executing a conditional layer, including instructions that configure the processing engine array 1010 to compute a result from the outputs of the most recent layer that was executed, and testing the result against a condition. For example, an instruction included in state 1008 read from the memory subsystem 1004 can configure the processing engine array 1010 to read the outputs of the preceding layer, and to compute a result from these outputs. In this example, the preceding layer is a hidden layer or any other layer other than the output layer. Also in this example, the processing engine array 1010 can compute the result using a particular logistic function, which may be identified by an instruction. As a further example, the same instruction or different instruction can include a condition against which to compare the result. In this example, the instruction can configure the processing engine array 1010 to test the result to determine whether the result meets the condition. The condition can, for example, call for testing the result against a test value, where the test is to see whether the result is greater than, less than, equal to, and/or not equal to the test value, or to conduct another type of comparison. In some examples, the processing engine array 1010 can compute the result and test the condition at the same time. In some examples, the processing engine array 1010 can compute the result directly from intermediate results being computed by the processing engine array 1010. In some examples, the processing engine array 1010 can compute the result and then store the result in the memory subsystem 1004, and then read the result to test the condition. In these and other examples, once the processing engine array 1010 has tested the result against the condition, the processing engine array 1010 can write the outcome of the test to the memory subsystem 1004, or to a register in the accelerator 1002, or to a storage location outside of the accelerator 1002.

In some examples, the pooling 1018 block can be used to assist in executing a conditional layer. For example, when the outputs of the preceding layer are computed by the processing engine array 1010, the pooling 1018 block can be configured to compute a result from the outputs. In this example, the outputs and the result can both be written to the memory subsystem 1004. Also in this example, the result output by the pooling 1018 can be input to the processing engine array 1010 for the processing engine array 1010 to test the result against a condition.

In some examples, the activation 1016 block can be configured to test the result against the condition. For example, the activation 1016 block can be configured such that, when the result is output from the processing engine array 1010, the activation 1016 block can test the result against the condition. In this example, the activation 1016 block can write an outcome of the test to the memory subsystem 1004 or to a register.

In some examples, the pooling 1018 block can be used when the condition requires manipulating multiple values. For example, the result may include a set of values, such as may be included in a vector computed by softmax. In this example, cascading sub-blocks in the pooling 1018 block can compare the values in the set against one another to identify the largest two, five, seven, or some other number of values. A final block in the cascade can compute a sum of the largest values, and then compare the sum against a test value. In this example, the result of the comparison determines whether the condition has or has not been met.

In the various examples discussed above, execution of the conditional layer completes with a value written to the memory subsystem 1004 or to a register, which indicates the outcome of testing the condition. Alternatively or additionally, the accelerator 1002 can write the value to a storage location outside of the accelerator 1002, such as in processor memory. In these and other examples, the accelerator 1002 can then wait for further instructions. For example, the accelerator 1002 may wait for input data 1050 and an instruction to continue processing. In this example, the input data 1050 can be a set of weights for the next layer that the accelerator 1002 is to execute. Alternatively or additionally, the input data 1050 can include an instruction for the accelerator 1002 to start a new inference, and the input data 1050 can include the data upon which to operate.

In some examples, in addition to or instead of writing a value indicating the outcome of the condition, the accelerator 1002 can determine the next action to take. For example, the conditional instruction can include a pointer, memory address, or other identifier for the next layer to execute when the condition is met. In this example, the conditional instruction can also include an identifier for a layer to execute when the condition is not met, or else indicate that the next sequential layer should be executed. In this example, the accelerator 1002 may be able to begin executing the layer identified by the conditional instruction. For example, the weights for the identified layer may already be present in the memory subsystem 1004. Alternatively, the accelerator 1002 may be able to request that the appropriate weights be loaded into the memory subsystem 1004.

In some examples, the accelerator 1002 may be instructed to stop in-progress computations, and reset to a start state. This may occur, for example, when the condition is met and the accelerator 1002 is being instructed to not continue with the current inference. To terminate an in-progress computation, the accelerator 1002 can, for example, flush all values in the processing engine array 1010 and discard the outputs. As a further example, the accelerator 1002 can delete values from the memory subsystem 1004 and/or move values to be ready to start a new inference. In some examples, the accelerator 1002 can immediately begin a new inference on input data 1050 that is waiting to be processed.

Input data 1050 can arrive over the chip interconnect 1020. The chip interconnect 1020 can connect the accelerator 1002 to other components of an acceleration engine, such as a DMA engine that can obtain input data 1050 from an I/O device, a storage drive, or a network interface. The input data 1050 can be, for example one-dimensional data, such as a character string or numerical sequence, or two-dimensional data, such as an array of pixel values for an image or frequency and amplitude values over time for an audio signal. In some examples, the input data 1050 can be three-dimensional, as may be the case with, for example, the situational information used by a self-driving car. In some implementations, the memory subsystem 1004 can include a separate buffer for the input data 1050. In some implementations, the input data 1050 can be stored in the memory banks 1014 along with the weights 1006.

In various implementations, the weights 1006 stored in the memory subsystem 1004 can have been determined by training the neural network to perform one or more tasks. The input data 1050 can include an instruction indicating the task to perform (e.g., image processing, speech recognition, machine translation, etc.). In various implementations, the accelerator 1002 is configured for conducting inference (e.g., performing a task), rather than for training of the neural network. In some implementations, the accelerator 1002 can be used for training, though perhaps with assistance from software to update the stored weights 1006.

In various implementations, the memory subsystem 1004 can include enough memory to store both intermediate results and all of the weight values for a neural network. The memory subsystem 1004 should have, at a minimum, enough memory in the memory subsystem 1004 to store intermediate results, but in many cases the memory subsystem 1004 can include many more memory banks 1014 than are needed to store just intermediate results. This additional space can be used to store all of the weight values for a neural network. For example, a neural network may have 1.5 million weights, which, when each is represented by 32 bits, can require about 6 MB of memory. Intermediate results can require, for example, 10 MB of storage space, at most. On-chip memory of 20 MB is a reasonable size, and, in the preceding example, can readily accommodate the weight values, intermediate results, and any other data that the accelerator 1002 can need during operation.

Figure 11:
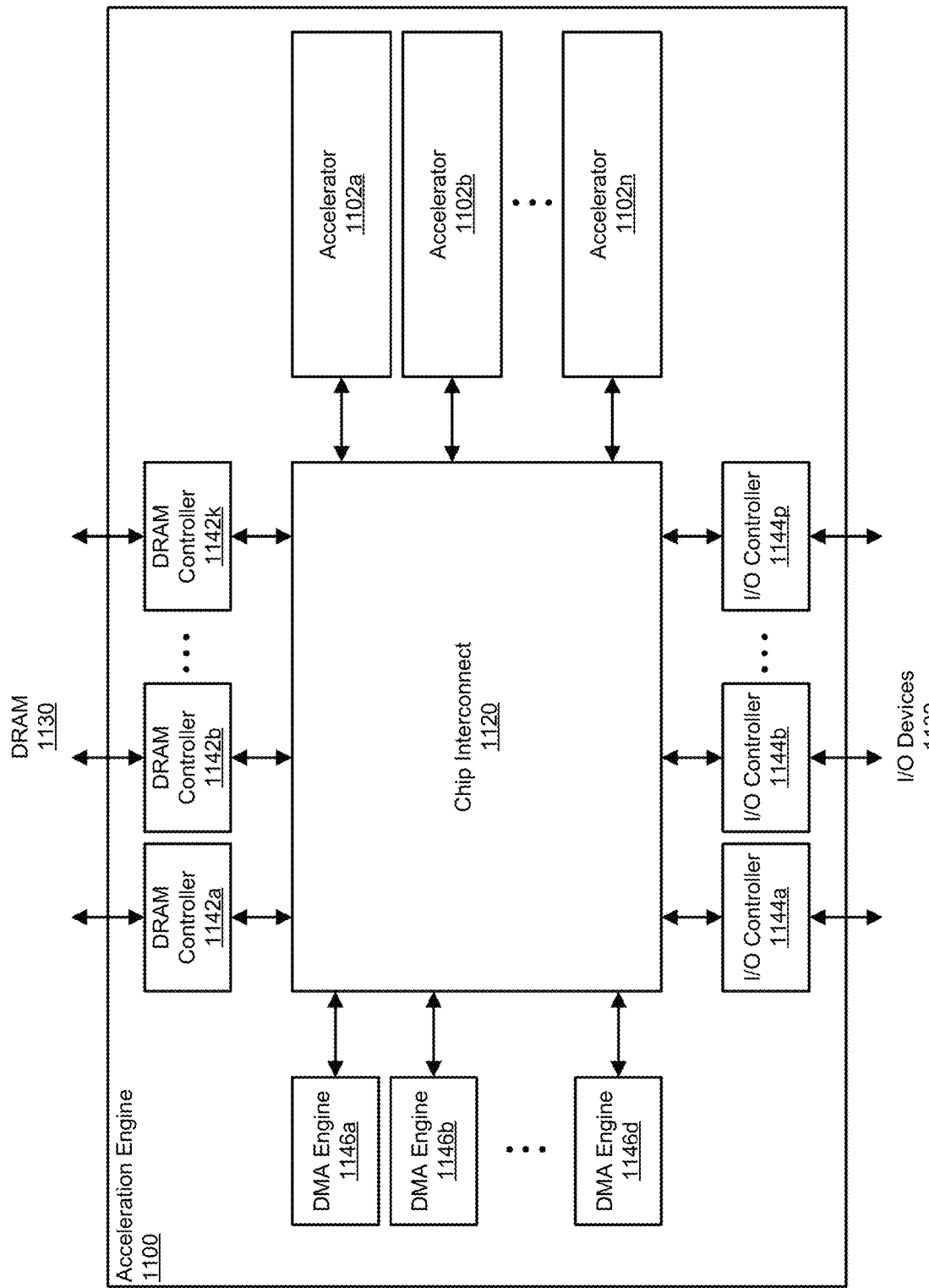
FIG. 11 illustrates an example of an acceleration engine that has multiple accelerators.

FIG. 11 illustrates an example of an acceleration engine 1100 that has multiple accelerators 1102*a*-1102*n*. Each of the accelerators 1102*a*-1102*n* can include a memory subsystem and processing engine array, and can execute the computation required for a neural network to perform a task for which the neural network was programmed. In the illustrated example, the acceleration engine 1100 includes n accelerators 1102*a*-1102*n*.

The example acceleration engine 1100 further includes DRAM controllers 1142*a*-1142*k* for communicating with processor memory, implemented in this example using DRAM 1130. In the illustrated example, the acceleration engine 1100 includes k DRAM controllers 1142*a*-1142*k*, each of which may be able to communicate with an independent set of banks of DRAM. In other examples, other types of RAM technology can be used for the processor memory. The DRAM controllers 1142*a*-1142*k* can also be referred to as memory controllers.

The example acceleration engine 1100 further includes Input/Output (I/O) controllers 1144*a*-1144*p* for communicating with I/O devices 1132 in the system. The acceleration engine 1100 can communicate with I/O devices over, for example, a processor bus. In some examples, the processor bus can be implemented using Peripheral Component Interconnect (PCI) and/or a variation of the PCI bus protocol. The processor bus can connect the acceleration engine 1100 to I/O devices 1132 such as, for example, input and output devices, memory controllers, storage devices, and/or network interface cards, among other things. In this example, the acceleration engine 1100 includes p I/O controllers 1144a-1144p, each of which may include a separate root complex and may communicate with a separate set of I/O devices 1132. In other examples, other standardized bus protocols, such as Ultra Path Interconnect (UPI) can be used for the host bus. In other examples, a proprietary bus protocol can be used.

The example acceleration engine 1100 further includes DMA engines 1146a-1146d that can move data between the accelerators 1102a-1102n, DRAM controllers 1142a-1142k, and I/O controllers 1144a-1144p. In the illustrated example, the acceleration engine 1100 includes d DMA engines 1146a-1146d. In some implementations, the DMA engines 1146a-1146d can be assigned to specific tasks, such as moving data from the DRAM controllers 1142a-1142k to the accelerators 1102a-1102n, or moving data between the I/O controllers 1144a-1144p and the accelerators 1102a-1102n. In some implementations, at least one DMA engine 1146a-1146d can be dedicated to each accelerator 1102a-1102n. In some implementations, the DMA engines 1146a-1146d can be treated as a pool instead of being dedicated to a function or component, such that whenever data needs to be moved, an available DMA engine 1146a-1146d is engaged.

In the example acceleration engine 1100, the various components can communicate over a chip interconnect 1120. The chip interconnect 1120 primarily includes wiring for routing data between the components of the acceleration engine 1100. In some cases, the chip interconnect 1120 can include a minimal amount of logic, such as multiplexors to control the direction of data, flip-flops for handling clock domain crossings, and timing logic.

In some examples, each of the accelerators 1102a-1102n can simultaneously be executing a different neural network. In some examples, two or more of the accelerators 1102a-1102n can execute the same neural network for different inputs. In some examples, two or more of the accelerators 1102a-1102n can be executing parts of the same neural network (e.g., parts of the same layer or different layers). In some examples, two or more of the accelerators 1102a-1102n can sequentially execute layers of a neural network, such that inputs can be pipelined through the acceleration engines.

Figure 12:
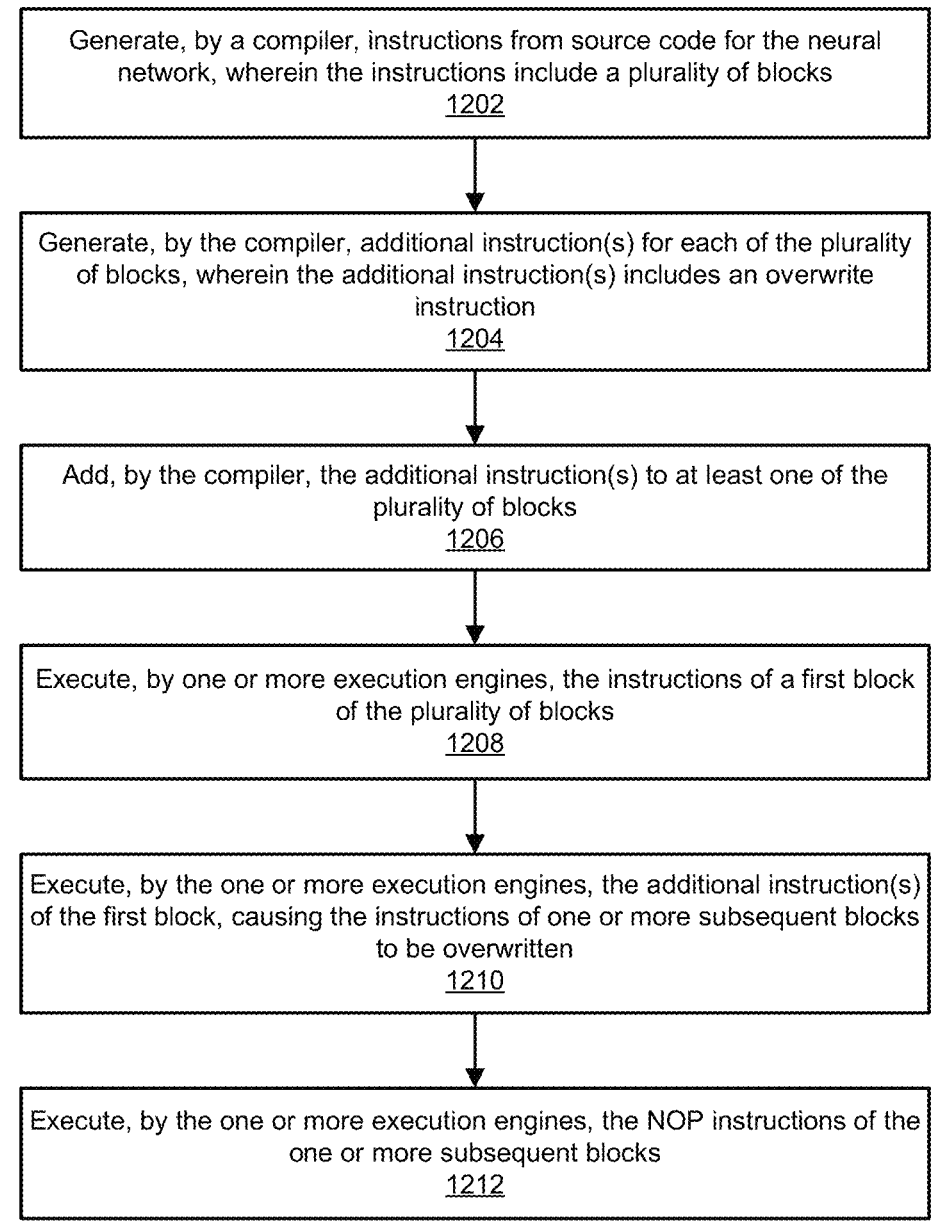
FIG. 12 illustrates an example of a method for reducing computation in neural network processing.

FIG. 12 illustrates an example of a method 1200 for reducing computation in neural network processing. The method 1200 may be implemented by the systems described above, such as for example the host system of FIG. 9, the accelerator of FIG. 10, and/or the acceleration engine of FIG. 11. One or more steps of method 1200 may be performed in a different order than that shown in the illustrated example, and one or more steps of method 1200 may be omitted during performance of method 1200.

At step 1202, a compiler generates instructions from source code for a neural network. The neural network may include a repeatable set of operations that may be performed up to a number of iterations based on a condition. The number of iterations may be a maximum number of iterations that the repeatable set of operations may be performed if the condition is never satisfied (e.g., the length of the "for" loop). The instructions that are generated by the compiler may include a plurality of blocks, where each block contains the instructions for the repeatable set of operations for a single iteration. Accordingly, the number of blocks generated by the compiler may be equal to the maximum number of iterations.

At step 1204, the compiler generates at least one additional instruction for at least one of the plurality of blocks. In some examples, the compiler may generate at least one additional instruction for each of the plurality of blocks. The at least one additional instruction may include an evaluation instruction that, when executed, causes a determination of whether the condition is satisfied. The at least one additional instruction may also include an overwrite instruction that, when executed, triggers an overwrite action when the condition is satisfied. The overwrite action causes the instructions of subsequent blocks to be overwritten with NOP instructions. In some examples, the overwrite action causes a DMA engine to overwrite the instructions of the subsequent blocks with the NOP instructions.

At step 1206, the compiler adds the at least one additional instruction to at least one of the plurality of blocks. In some examples, the compiler may add the at least one additional instruction to each of the plurality of blocks. The compiler may add the at least one additional instruction by overwriting existing instructions, by inserting between existing instructions, and/or by modifying existing instructions, etc. The at least one additional instruction may be added at the end of a block, at the beginning of a block, or in the middle of a block. In examples where the at least one additional instruction is added at the end of the block, the compiler may skip the last block when adding the instruction(s). In examples where the at least one additional instruction is added at the beginning of the block, the compiler may skip the first block when adding the instruction(s). After adding the at least one additional instruction, the blocks may be transferred to one or more execution engines for runtime execution.

At step 1208, one or more execution engines execute the instructions of a first block of the plurality of blocks. Executing the instructions of the first block may cause the one or more execution engines to perform the repeatable set of operations for a single iteration.

At step 1210, the one or more execution engines execute the at least one additional instruction of the first block. In response to executing the evaluation instruction of the first block, the one or more execution engines may determine that the condition is satisfied. In response to executing the overwrite instruction of the first block, the one or more execution engines may trigger the overwrite action, causing the instructions of subsequent blocks of the plurality of blocks to be overwritten with the NOP instructions. In some examples, the overwrite action also causes the at least one additional instruction of the subsequent blocks to be overwritten with the NOP instructions.

At step 1212, the one or more execution engines execute the NOP instructions of the one or more subsequent blocks. In some examples, executing the NOP instructions does not cause variables stored in a processor memory to change. In some examples, executing the NOP instructions does not cause computational data values stored in a processor memory to change.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method comprising:
    generating, by a compiler for a neural network, N blocks of instructions from source code, wherein each block of the N blocks of instructions includes a set of common instructions that are common to each block, and wherein, during execution of the N blocks of instructions, the set of common instructions are performed up to a number of iterations based on a condition;
    generating an overwrite instruction for each of the first N-1 blocks of instructions of the N blocks of instructions, wherein execution of the overwrite instruction triggers an overwrite action that causes the instructions of each subsequent block of instructions of the N blocks of instructions to be overwritten with no operation (NOP) instructions that are to be executed during execution of each subsequent block of instructions, such that the instructions of each subsequent block of instructions are modified at a memory in response to triggering the overwrite action, wherein N is greater than or equal to 3; and
    adding the overwrite instruction within and at an end of each of the first N-1 blocks of instructions after the set of common instructions.

2. The method of claim 1, wherein the overwrite action causes a direct memory access (DMA) engine to overwrite the instructions of each subsequent block of instructions with the NOP instructions.

3. The method of claim 1, wherein execution of the overwrite instruction triggers the overwrite action when the condition is satisfied.

4. The method of claim 1, wherein the set of common instructions corresponds to a repeatable set of operations performed in a node or a layer of the neural network.

5. The method of claim 1, further comprising:
    generating an evaluation instruction that, when executed, causes a determination of whether the condition is satisfied; and
    adding the evaluation instruction to each of the first N-1 blocks of instructions.

6. The method of claim 5, wherein the overwrite action causes the evaluation instruction to be overwritten with a NOP instruction in each subsequent block of instructions.

7. The method of claim 1, further comprising:
    identifying, by the compiler, a repeatable set of operations in the source code for the neural network, wherein the overwrite instruction is generated in response to identifying the repeatable set of operations.

8. An integrated circuit device for neural network processing, the integrated circuit device comprising:
    a memory operable to store N blocks of instructions generated by a compiler from source code implementing a repeatable set of operations, wherein the repeatable set of operations are performed up to a number of iterations based on a condition, wherein each of the N blocks of instructions includes a set of common instructions corresponding to an iteration of the repeatable set of operations, wherein each of the first N-1 blocks of instructions of the N blocks of instructions includes an overwrite instruction added by the compiler within and at an end of each of the first N-1 blocks of instructions after the set of common instructions, wherein N is greater than or equal to 3; and
    one or more execution engines configured to perform operations comprising:
        executing the set of common instructions of a first block of instructions of the N blocks of instructions;
        after executing the set of common instructions of the first block of instructions, executing the overwrite instruction of the first block of instructions;
        determining that the condition is satisfied;
        in response to executing the overwrite instruction of the first block of instructions and to determining that the condition is satisfied, triggering an overwrite action that causes a second block of instructions to be overwritten with no operation (NOP) instructions that are to be executed during execution of the second block of instructions, such that the second block of instructions are modified at the memory in response to triggering the overwrite action; and executing the NOP instructions of the second block of instructions.

9. A non-transitory computer-readable storage medium comprising instructions that, when executed by a processor, cause the processor to perform operations comprising:
generating, by a compiler for a neural network, N blocks of instructions from source code, wherein each block of the N blocks of instructions includes a set of common instructions that are common to each block, and wherein, during execution of the N blocks of instructions, the set of common instructions are performed up to a number of iterations based on a condition;
generating an overwrite instruction for each of the first N-1 blocks of instructions of the N blocks of instructions, wherein execution of the overwrite instruction triggers an overwrite action that causes the instructions of each subsequent block of instructions of the N blocks of instructions to be overwritten with no operation (NOP) instructions that are to be executed during execution of each subsequent block of instructions, such that the instructions of each subsequent block of instructions are modified at a memory in response to triggering the overwrite action, wherein N is greater than or equal to 3; and
adding the overwrite instruction within and at an end of each of the first N-1 blocks of instructions after the set of common instructions.

10. The non-transitory computer-readable storage medium of claim 9, wherein the overwrite action causes a direct memory access (DMA) engine to overwrite the instructions of each subsequent block of instructions with the NOP instructions.

11. The non-transitory computer-readable storage medium of claim 9, wherein the operations further comprise:
adding an evaluation instruction to each of the first N-1 blocks of instructions that, when executed, causes a determination of whether the condition is satisfied.

12. The non-transitory computer-readable storage medium of claim 11, wherein the evaluation instruction precedes the overwrite instruction in each of the first N-1 blocks of instructions.

13. The non-transitory computer-readable storage medium of claim 11, wherein the overwrite action causes the evaluation instruction of each subsequent block of instructions to be overwritten with the NOP instructions.

* * * * *